(12) United States Patent
Kramer

(10) Patent No.: US 7,079,481 B2
(45) Date of Patent: Jul. 18, 2006

(54) REDUNDANT NETWORK CONTROLLER MANAGEMENT SYSTEM

(75) Inventor: Randall Budd Kramer, Westminster, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 959 days.

(21) Appl. No.: 10/037,372

(22) Filed: Jan. 4, 2002

(65) Prior Publication Data

US 2003/0128663 A1    Jul. 10, 2003

(51) Int. Cl.
*G06F 11/00* (2006.01)
(52) U.S. Cl. ..................... 370/218; 370/220
(58) Field of Classification Search ............... 370/217, 370/219, 220; 709/208
See application file for complete search history.

(56) References Cited

U.S. PATENT DOCUMENTS

| | | | |
|---|---|---|---|
| 5,758,052 A | 5/1998 | Glowny et al. | |
| 5,909,427 A | 6/1999 | Manning et al. | |
| 5,978,569 A * | 11/1999 | Traeger | 709/244 |
| 5,996,001 A * | 11/1999 | Quarles et al. | 709/203 |
| 6,202,170 B1 * | 3/2001 | Busschbach et al. | 714/11 |
| 6,701,453 B1 * | 3/2004 | Chrabaszcz | 714/13 |
| 6,941,391 B1 * | 9/2005 | Kasper | 710/22 |
| 2002/0186653 A1 * | 12/2002 | Jensen | 370/219 |

* cited by examiner

*Primary Examiner*—Chau Nguyen
*Assistant Examiner*—Mohammad S. Adhami
(74) *Attorney, Agent, or Firm*—Patton Boggs LLP

(57) ABSTRACT

A redundant network call management system comprising interconnected duplicate call processing devices connected to a plurality of port network controllers, the plurality of port network controllers interconnected via a token bus. One of the duplicate call processing devices is active and the other call processing device is inactive and one of the plurality of port network controllers is a master port network controller. The active call processing device receives call requests and processes the call requests to generate call routing instructions that are sent to the master port network controller. When the interconnection between the duplicate call processing devices fails, both of the duplicate call processing devices transition to an active state and instruct one of the plurality of port network controllers to operate as master. When one or more port network controller receives an instruction to transition to a master state the one or more port network controllers request a token and the port network controller that receives the token transitions to master port network controller.

9 Claims, 5 Drawing Sheets

REDUNDANT NETWORK CONTROLLER MANAGEMENT SYSTEM

FIELD OF THE INVENTION

The invention relates to a system for managing redundant network controllers within a telephony switching system, and in particular, to an apparatus and method for establishing a communication path between duplicate call processing devices and redundant port network controllers.

PROBLEM

It is a problem in the field of telecommunications to prevent more than one port network controller from becoming the master port network controller while also assigning a master port network controller without causing delays, interruptions in service, and errors.

A known method of securing a telephony switching system against complete failure is the use of redundant components within the telephony switching system. Redundant components and communication links within a switching system have been used to reduce or eliminate the problems associated with the failure of one component or the failure of a communication link between components.

Redundant Systems or Links

An existing redundant telephony switching system comprises duplicate call servers interfacing with redundant port network controllers via one or more dedicated transmission lines. The call server processes call requests initiated from internal devices connected to a port within the system or an externally generated call requesting connection to an internal device.

In the redundant system, a first call server has a communication link with a second call server for transferring call requests and call set-up information between the duplicate call servers. Duplicate call servers are utilized to protect a telephony system from going out-of-service in the event one of the call servers fails. A communication link between the duplicate call servers provides a method for the duplicate call servers to receive the same updated information so that when the active call server fails, the transition between the active call server and the inactive call server does not interfere with service.

When the communication link between the duplicate call servers fails, the duplicate call servers cannot distinguish between a link failure and a call server failure. Therefore, when the link fails, each of the duplicate call servers becomes an active call server without knowledge of the status of the other call server. As active call servers, each call server randomly selects a port network controller and instructs that port network controller to operate as the master. A problem arises when more than one port network controller is assigned as master. Operation with more than one master port network controllers processing call routing instruction simultaneously results in corrupted data and message may go to wrong port board or may be lost. Since the redundant port network controllers are not aware of the status of the other port network controllers, the simultaneous transmission continues until the system is overloaded, causing a complete system failure.

Configuring a telephony system with duplicate call servers and redundant port network controllers is intended to prevent the telephony system from complete failure. The redundant telephony system just described fails to provide an apparatus or method to insure against complete system failure in the event the communication link between the duplicate call servers fails.

Another redundant switch system for increasing the availability and reliability of a digital switching system is disclosed in Manning, et al., (U.S. Pat. No. 5,909,427). The redundant switch and method of operation in Manning, comprises a foreground and a background control module that are connected in the same manner to the same plurality of I/O controllers. The redundant switch has the ability to systematically and routinely check the operation of the background switch during actual operation. The background switch control module operates in the background and serves as a redundant module in the event that the foreground switch control module fails or is taken out of service.

Manning, recognizes the criticality that components of background control module are operating correctly so that in the event of a failure, background control module may be relied upon for continued operation. However, the redundant switch system disclosed by Manning fails to provide a contingency for operating the digital switching system in the event the I/O serial link between the foreground and the background control modules fails.

Mesh Interconnection

Another method of preventing complete system failure when a call processing server or link fails is to provide a mesh of interconnecting links between the redundant port network controllers. Utilizing a mesh of interconnecting links allows each port network controller to know the status of the other redundant port network controllers, thus preventing more than one master port network controller.

A mesh of independent communication paths between each port network controllers could be used to solve the problem of allocating control of the network to one port network controller. However, as additional port network controllers are added to the mesh, the interconnecting mesh is increased by the number of connection required for the added port network controller to communicate with every other port network controller within the mesh.

Although the interconnecting mesh could be used by the redundant port network controllers to communicate and assign control to one port network controller, the interconnecting mesh is not practical and each of the port network controllers would need to have knowledge of the other port network controllers in the system. The processing time required for each port network controller to communicate with every other port network controller to locate the master would result in significant delays causing interruptions in service.

Negotiating Network Control

A system for negotiating control of a network having a plurality of control point processors that are interconnected is described by Glowny, et al., (U.S. Pat. No. 5,758,052). In Glowny, et al., each control point processor is connected to the other control point processors. When the plurality control point processors are initialized each processor initiates negotiations with the other control point processors to determine which should be designated as primary. Negotiation results in the designation of a single primary and one or more alternate control points. A client processor queries the other control points to locate the primary control point. If the primary control point does not respond to a client request, the client processor notifies an alternate control point of the need for that processor to assume primary control point activities.

The process disclosed in Glowny, requires a client processor to monitor the plurality of control points and to maintain a directory identifying the primary control point and alternate control points. The process fails to provide a method for automatically transitioning to a new primary control point without causing delays or interruptions in service. It also requires additional hardware at an additional cost and requires the control points to negotiate when the system is initialized, causing delays at initialization.

The redundant system configurations just described fail to provide an apparatus or method for reliably transiting to a single master port network controller when both call servers are functioning as an active call server, thus resulting in catastrophic system failure.

For these reasons, a need exists for a reliable apparatus and method for transitioning between duplicate and/or redundant components within a telephony system without causing delays, interruptions in service, and error.

SOLUTION

The present redundant network controller management system overcomes the problems outlined above and advances the art by providing a method for automatically assigning one port network controller as master in the event the communication link between duplicate call servers fails.

The present redundant network controller management system comprises redundant port network controllers all connected to the same token bus. The token bus connection provides a method for one port network controller to become the master in the event the communication link between the duplicate call servers fails. In a token bus connection, each port network controller on the token bus has access to a token. When the system is initialized and when one or more call servers instructs a port network controller to operate as master, the port network controllers receiving an instruction from one or more call servers, requests the token. The token is given to the first requestor and subsequent token requests are denied. Port network controllers signal the call server that assigned that port network controller as master of the result of the token request. The port network controller that receives the token transition to master port network controller and the remaining redundant port network controllers remain in an inactive state.

Utilizing the present redundant network controller management system, additional port network controllers can be added to the network without requiring additional communications links and the port network controllers are not required to monitor or otherwise be aware of other port network controllers on the token bus. Additional port network controllers simply require access for requesting the token, thus eliminating the time required for each port network controller or other apparatus to poll the other port network controllers to locate a master, thus reducing the time required for the transition.

The present redundant network controller management system provides an apparatus and method to transition to a single master port network controller in the event that the communication link between duplicate call servers fails, without causing call processing delays, interruptions in service, and errors.

DETAILED DESCRIPTION

The present redundant network controller management system summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

Figure 1:
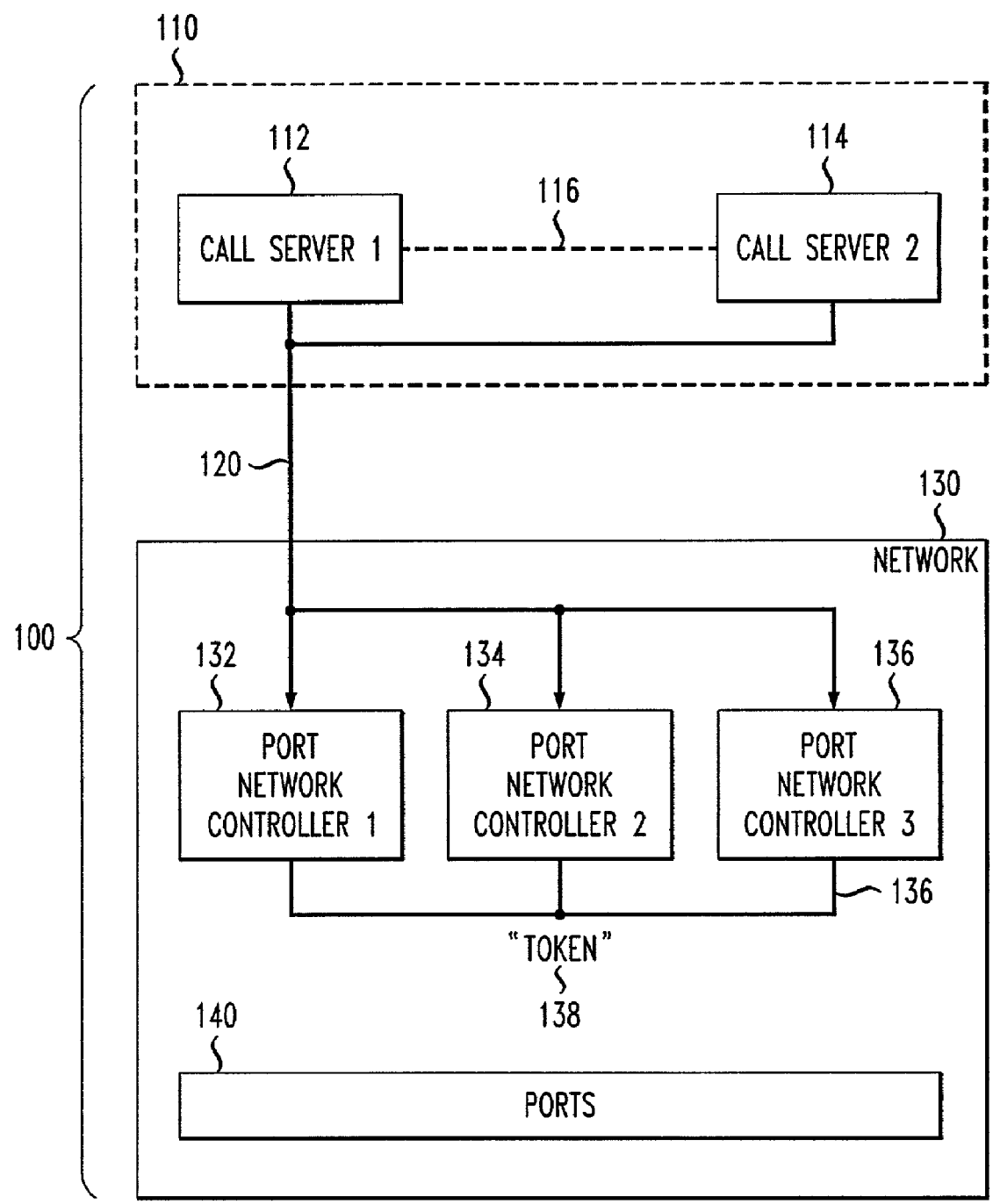
FIG. 1 illustrates a block diagram of the present redundant network controller management system.
Figure 2:
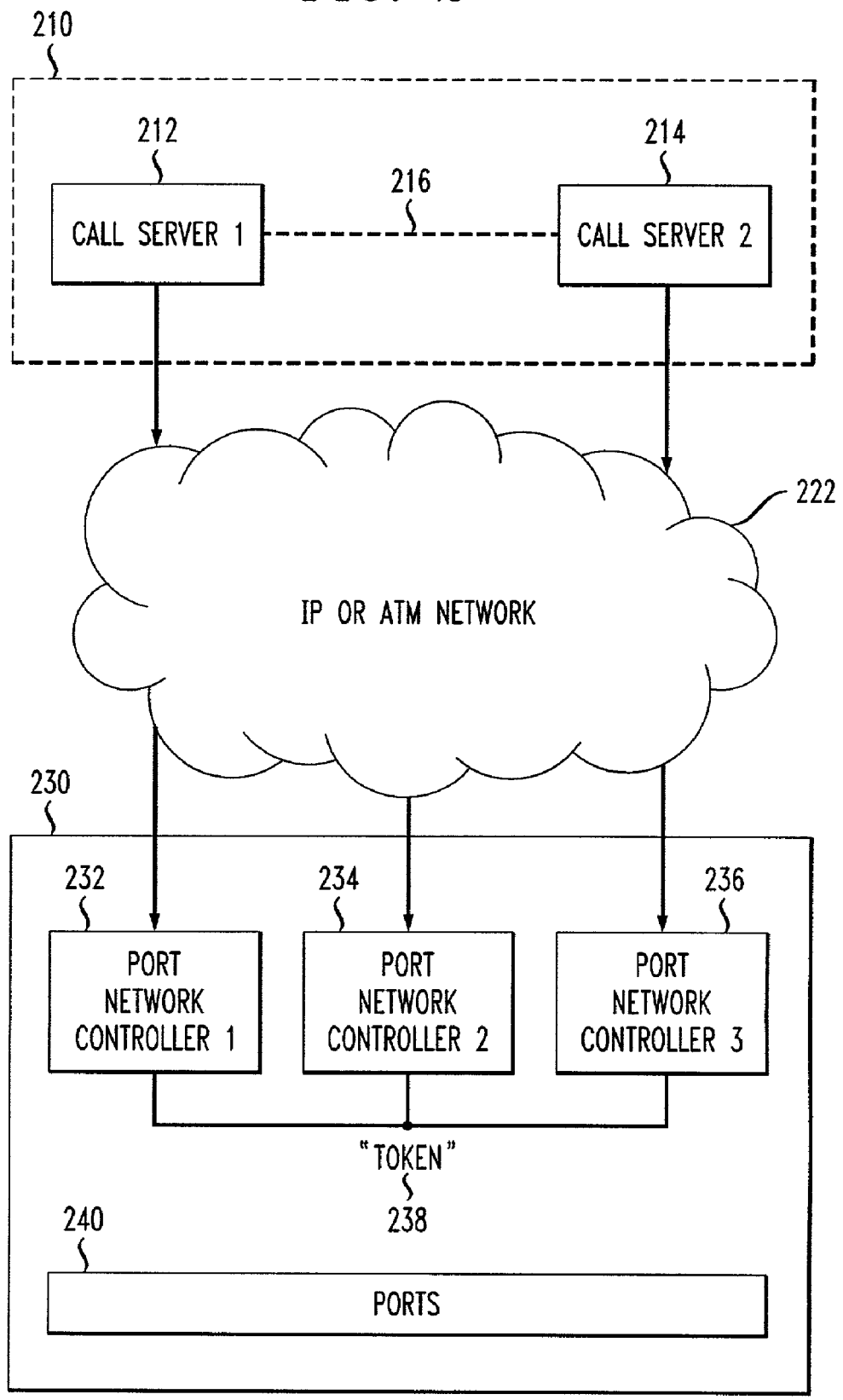
FIG. 2 illustrates a block diagram of an embodiment of the present redundant network controller management system.
Figure 3:
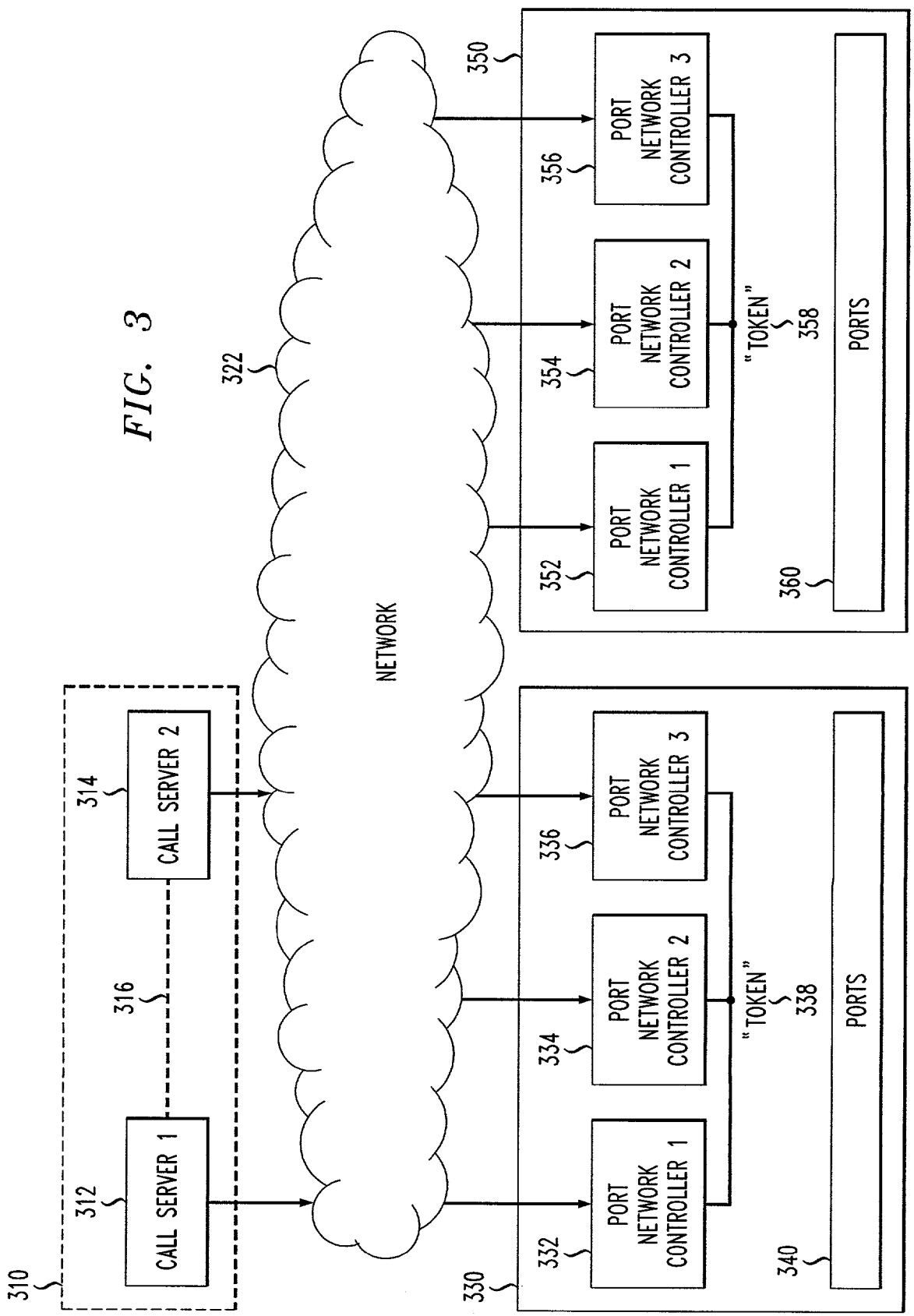
FIG. 3 illustrates a block diagram of another embodiment of the present redundant network controller management system.

Duplicate Telephony Switching System Configurations—FIGS. 1, 2 and 3:

Referring to FIG. 1, the telephony switching system utilizing the present redundant network controller management system comprises duplicate call servers, 112 and 114 connected via a communication link 116. A call server is the central processing component of the telephony system. The call server receives call requests, determines the availability of ports for connecting the call and send call routing instructions to the master port network controller to connect the necessary ports to complete the call. A call server may process call requests for more than one network 130 of redundant port network controllers, although only one network 130 is illustrated in FIG. 1. Duplicate call servers within a telephony system function to prevent complete system failure in the event one of the call servers fail. When duplicate call servers are connected within a single telephony system, one of the call servers is active and the duplicate call server is inactive.

To transition system operation from an active call server to an inactive call server without interruption in service, a communication link is provided between the duplicate call servers. Still referring to FIG. 1, when first call server 112 is active, second call server 114 is inactive. Call requests from voice terminals, modems or other devices connected to the ports 140 within network 130 are routed via a bus interface (not illustrated) to the first call server 112 which passes the call request to the second call server 114. In this embodiment, the master port network controller passes the call requests to the active call server for processing. After the active call server processes the call requests, the call routing instructions are sent to master port network controller and the master port network controller connects the calls. Communication link 116 provides an apparatus for active first call server 112 to provide call requests to inactive second call server 114 so that both call servers have the same information available in real time. Port availability and call routing information is retained in memory so that when an inactive call server transitions to active, all information for a seamless transition is available. Thus, if active first call server 112 fails, inactive second call server 114 transitions to an active state and responds to call requests without interruption in service.

Similarly, the illustrated duplicate telephony switching system utilizing the present redundant network controller management system includes redundant port network controllers 132, 134 and 136 all connected to a token bus. Only one port network controller is master, the port network controller with the token, and the remaining port network controllers are inactive. In this example, port network controller 132 is master. Master port network controller 132 receives call requests and passes the call requests to the active call server. The active call server processes the requests and sends call routing instructions to the master port network controller which processes the call routing instructions by connecting the necessary ports 140 within network 130 to complete the call.

Duplicate telephony switching system 100 is comprised of a plurality of ports 140 within network 130 that connect calling devices (not shown) such as voice terminals and modems and transmission lines, or trunks, for transmitting data within the local or long distance network. Ports are also connected to complete internal calls between voice terminals and other transmitting and receiving devices connected directly to the network of ports. A private, or dedicated line 120 allows first call server 112 or second call server 114, whichever is active, to interface with port network controllers 132, 134, and 136 although only the master port network controller responds to the instructions.

Referring to FIG. 2, in another embodiment the duplicate telephony switching system 200 is configured with call processing system 210 located distant from network 230. In this embodiment, internal and external call requests are routed by the master port network controller to call processing system 210 comprising first and second call servers 212 and 214. The active call server, first call server 212 in this embodiment, receives the call requests, processes the requests and sends call routing instructions to the master port network controller, the first port network controller 232 in this embodiment. In this embodiment, the call requests and call routing instructions are transmitted via a network interface 222 such as an internet protocol (IP), an asynchronous transfer mode (ATM) network, or other network protocol. Master port network controller 232 processes the instructions by connecting ports 240 within network 230 to complete the requested calls.

Referring to FIG. 3, in yet another embodiment, duplicate first call server 312 and second call server 314 process call request for two networks, 330 and 350. Each network, as previously discussed, comprises redundant port network controllers 332, 334 and 336 in first network 330 and 352, 354 and 356 in second network 350. Redundant port network controllers in each of the two network are connected to a token bus within that network. As in the previous embodiments, only the active call server sends call routing instructions to the master port network controller within first network 330 and second network 350. Each master port network controller connects calls routed to ports within the master port network controllers network. For example, a call originating and ending within network 330 is processed by the active call server. Call routing instructions are sent from the active call server to the master port network controller within network 330, and the ports are connected to complete the call.

Call Server Communication Link Failure—FIG. 1:

Referring back to FIG. 1, a problem arises when the communication link 116 between active first call server 112 and inactive second call server 114 fails. Inactive second call server 114 can not distinguish between a failure of active first call server 112 and a failure of communication link 116. Therefore, inactive second call server 114 switches to an active state. Likewise, active first call server 112 can not distinguish between a failure of inactive second call server 114 and communication link 116 and remains in an active state processing call requests. Active first call server 112 continues sending call routing instructions to master port network controller 132. Active second call server 114 instructs another port network controller to operate as a master.

In the prior art, port network controllers that did not receive an instruction to transition to a master state remained in their previous inactive state. For example, if first port network controller 132 is master when communication link 116 fails, it will remain in the master state unless instructions are received instructing master port network controller 132 to transition to an inactive state. Likewise, if an inactive port network controller is instructed to be master, the inactive port network controller transitions to a master status. Two port network controllers processing the same call processing instructions results in lost data, interruption in service and eventual system failure. Implementing a token bus connection between the redundant port network controllers overcomes the problem of more than one master port network controller.

Port Network Controller Token Bus Connection—FIG. 1:

The present redundant network controller system implements a token bus connection between the redundant port network controllers to prevent more than one port network controller from being master at the same time. Using the token bus connection illustrated in FIG. 1, first, second, and third port network controllers, 132, 134, and 136 respectively, are connected to a single token bus. Using the token bus connection, a token must be received by the port network controllers before a port network controller can transition into a master state. Once in the master state, the port network controller having the token notifies the call server that instructed the port network controller to operate as master that the port network controller received the token. The master port network controller then sends call requests to the active call server and responds to call routing instructions received from the active call server.

Figure 4:
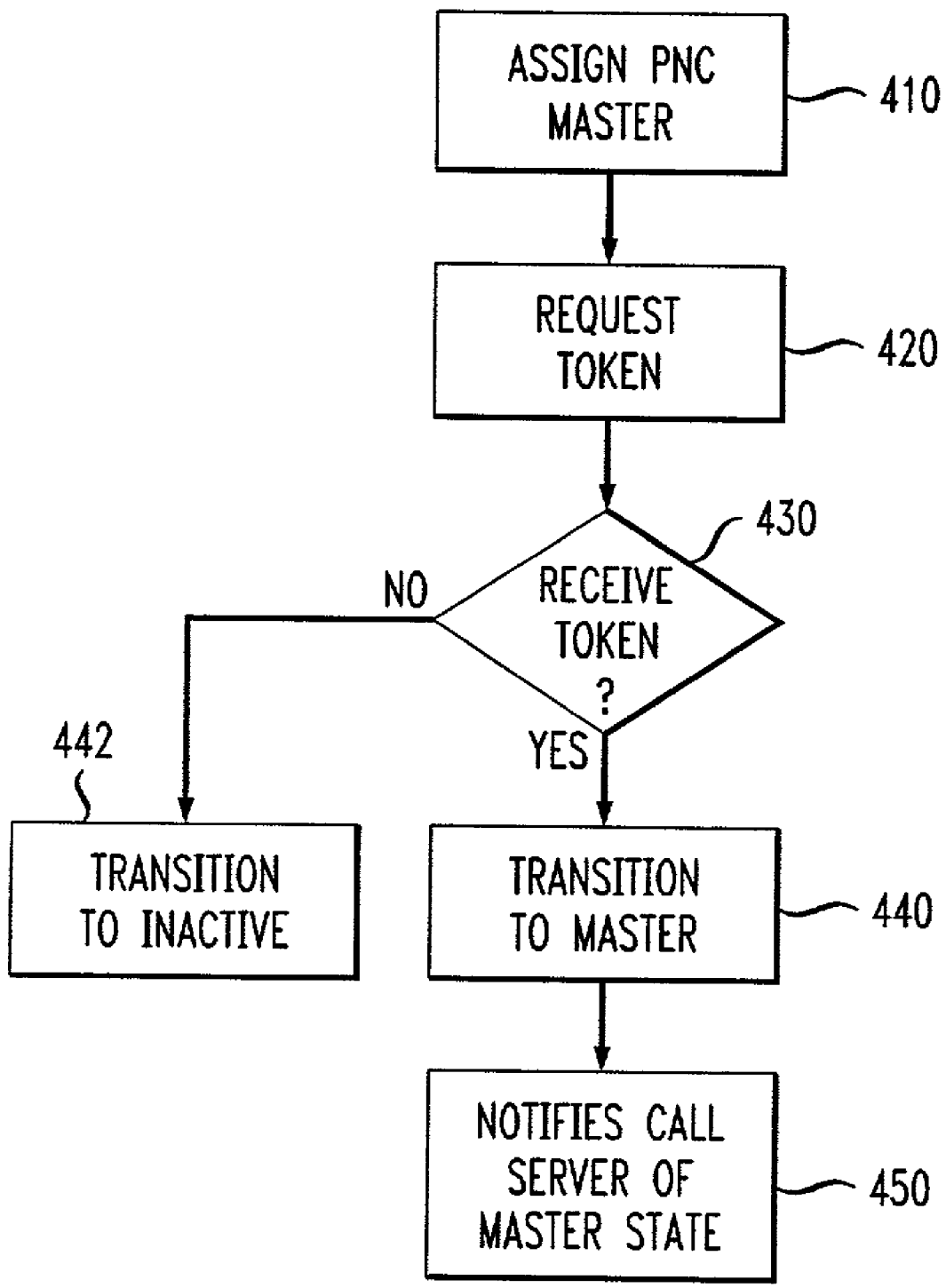
FIG. 4 illustrates a flow diagram of the operating steps of the present redundant network controller management system during initialization of a telephony switching system.

Operational Steps during Initialization—FIG. 4:

Referring to the flow diagram in FIG. 4, when the telephony switching system is initialized, the active call server instructs one of the redundant port network controllers in block 410 to operate as master. The redundant port network controllers that are not instructed in step 410 to operate as master, stay in an inactive state. The redundant port network controller receiving the instruction requests the token in step 420. In decision step 430, the redundant port network controller that requested the token determines if the token was received. When the port network controller that received the token, transitions to a master state in step 440 and notifies the active call servers in step 450 that the particular port network controller is master. If the redundant port network controller does not receive the token, the call server instructing the port network controller to operate as master is informed and the port network controller transitions to an inactive state in block 442.

In an alternative embodiment, when the telephony switching system is initialized each of the redundant port network controllers connected to the token bus requests the token and the token is passed to the first requestor. In this embodiment, redundant port network controllers that are not passed the token transition to an inactive state. The port network controller that received the token transitions to the master state and notifies the call servers as previously described.

Figure 5:
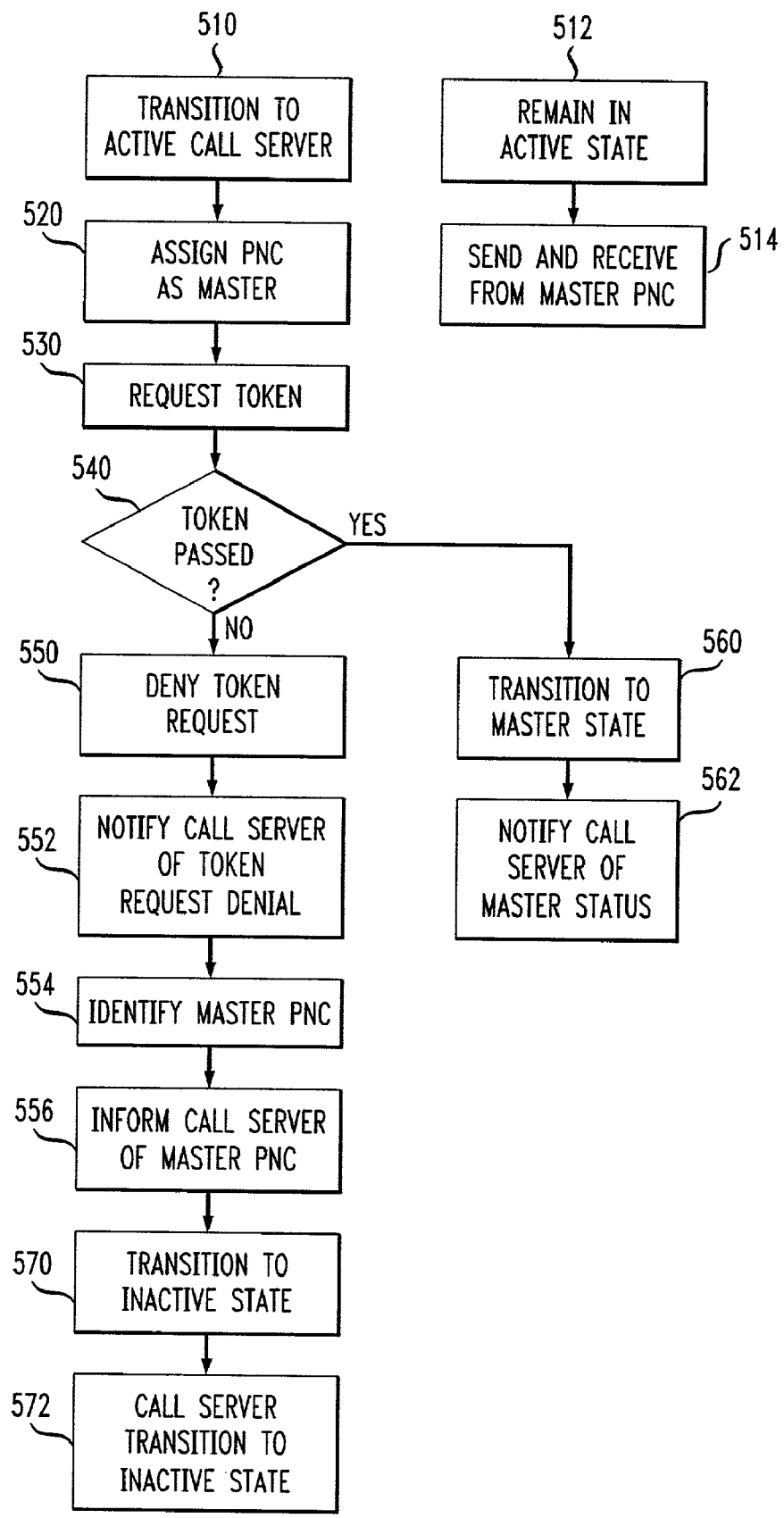
FIG. 5 illustrates a flow diagram of the operating steps of the present redundant network controller management system following failure of a communication link between duplicate call servers.

Operational Steps Following Communication Link Failure—FIGS. 1 and 5:

The flow diagram in FIG. 5 illustrates operation of the redundant controller network management system when the communication link between the duplicate call servers fails during operation. When the communication link between the duplicate call servers fails, both the active and the inactive duplicate call servers transition to an active state in steps 510 and 512. The previous active call server continues receiving call requests from the master port network controller in block 514 and sending call routing instructions to the master port network controller. The previously inactive duplicate call server instructs one of the redundant port network controllers in step 520 to operate as master. Upon receipt of the instruction, regardless of the state of the instructed port network controller, the port network controller requests the token in step 530. If the token is available the token is given in step 540 to the requesting port network controller. If the token is not available, the request is denied in step 550 and the requesting port network controller notifies the call server of the denial in step 552. The call server instructs the port network controller to determine which port network controller has the token in block 554. The port network controller checks the token bus to determine which port network controller has the token, informs the call server in block 556 then the port network controller and call server transition to an inactive state in steps 570 and 572 respectively.

If the requesting port network controller receives the token in step 540, the port network controller with the token transitions to a master state in step 560. Once in the master state, the master port network controller notifies the call server step 562.

Referring back to FIG. 1, if call server 132 is active prior to the failure of the communication link and port network controller 132 is the master, when communication link 116 fails, active call server 112 continues sending call routing instructions to master port network controller 132. Duplicate call server 114 transitions to an active state and instructs one of the redundant port network controllers to operate as master. For purpose of example only, active second call server 114 instructs port network controller 134 to transition to a master state. Since port network controller 134 is inactive, port network controller 134 will request the token. However, master port network controller 132 still has the token and the token request is denied. Port network controller 134 notifies active second call server 114 of the denial. Active second call server 114 instructs port network controller 134 to determine which port network controller has the token. Port network controller 134 checks the token but to determine which port network controller has the token and informs active second call server 114. Second call server transitions to transitions to an inactive state and port network controller 134 remains inactive.

In the event there is a duplicate failure wherein communication link 116 between active call server 112 and inactive call server 114 fails and active call server 112 looses communication with master port network controller 132, master network controller 132 will reset, returning the token.

In this scenario, active call server 112 and active call server 114 will each instruct one of the redundant port network controllers to be master. As previously discussed, each instructed port network controller will request the token and the port network controllers that receives the token will transition to the master state and the other port network controller will inform the call server as described previously.

Referring to FIG. 3, when more than one network, 330 and 350 in this embodiment, receives call processing instructions from the same active call server, the port network controllers within each network respond simultaneously following the same token request process to assign one port network controller as master within each network. The master port network controllers notify the duplicate call servers as previously described.

Using the token bus connection just described, the number of port network controllers within a single network can be increased without increasing the time required for one port network controller to be assigned as master. Redundant port network controllers within the network that did not receive the token transition to an inactive state. It is not necessary for the inactive port network controllers to know which port network controller is active.

As to alternative embodiments, those skilled in the art will appreciate that the present redundant network controller management system can be implemented utilizing a variety of token bus connections.

It is apparent that there has been described, a redundant network controller management system, that fully satisfies the objects, aims, and advantages set forth above. While the redundant network controller management system has been described in conjunction with specific embodiments thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed is:

1. A redundant network management system for assigning a master port network controller to control the operation of at least one of a plurality of network ports in response to received call requests, the system comprising:

two call processing devices, wherein one of the two call processing devices is active and the other one of the two call processing devices is inactive;

interconnecting means for connecting the two call processing devices, wherein the active one of the two call processing devices receives call requests, generates a call routing instruction, and sends a copy of the received call requests to the inactive call processing device;

at least two port network controllers connected to the two call processing devices for receiving call routing instructions from the active one of said two call processing devices to control the operation of at least one said plurality of network ports in response to said received call requests; and port network controller selection means, connected to said at least two port network controllers and operating independent of said interconnecting means functioning to interconnect said two call processing devices, for assigning one of the at least two port network controllers as the master port network controller, wherein the one of the at least two port network controllers that is assigned as the master port network controller processes the call routing instructions received from the active one of said two call processing devices.

2. The redundant network management system of claim 1 wherein the means for assigning further comprises:
a token bus interconnecting the at least two port network controllers, wherein one of the at least two port network controllers request a token and the one of the at least two port network controllers that receives the token is the master port network controller.

3. A redundant network management system for assigning a master port network controller to control the operation of at least one of a plurality of network ports in response to received call requests, the system comprising:
an inactive call processing device;
an active call processing device to process a plurality of call requests and generate a plurality of call routing instructions;
a means for interconnecting the active call processing device and the inactive call processing device such that, when the active call processing device receives the plurality of call requests, the active call process device sends a copy of the plurality of call requests to the inactive call processing device;
two or more port network controllers connected to the active call processing device and the inactive call process device to receive the plurality of call routing instructions from the active one of said two call processing devices to control the operation of at least one of said plurality of network ports in response to said received call requests; and
a token bus interconnecting the two or more port network controllers, wherein at least one of the two or more port network controllers requests a token, and the one of the two or more port network controllers that receives the token is assigned as the master port network controller to process the plurality of call routing instructions received from the active call processing device, independent of the functioning of said means for interconnecting.

4. The system of claim 3 further comprising:
a communication channel interconnecting the two or more port network controllers to the active call processing device and the inactive call processing device, wherein the active call processing device sends the plurality of call routing instructions to the master port network controller via the communication channel.

5. The system of claim 3, wherein a means for interconnecting comprises:
a communication link interconnecting the inactive call processing device and the active call processing devices, wherein, when the communication link fails, the inactive call processing device transitions to an active state.

6. A method of assigning a master port network controller in a telephony switching system comprising an active call processing device connected to an inactive call processing device via a communication link, and the active call processing device processes a plurality of call requests and transmits a plurality of call routing instructions over a channel to a plurality of port network controllers to control the operation of at least one of a plurality of network ports in response to received call requests and sends a copy of the received call request to the inactive call processing device, wherein the plurality of port network controllers are interconnected via a token bus connection, the method comprising:
sending at least one instruction from at least one of the duplicate call processing devices to at least one of the plurality of port network controllers instructing the at least one of the plurality of plurality of port network controllers to operate as the master port network controller independent of said communication link functioning to interconnect said two call processing devices;
sending at least one request for a token from the at least one of the plurality of port network controllers that received the at least one instruction; and
giving the token to one of the at least one of the plurality of port network controllers that sent the at least one quest for a token, wherein the one of the plurality of port network controllers that receives the token operates as the master port network controller.

7. The method of claim 6 wherein sending at least one instruction further comprises:
sending a first instruction from the active call processing device to a first one of the plurality of port network controllers instructing the first one of the plurality of port network controllers to operate as the master port network controller; and
sending a second instruction from the inactive call processing device to a second one of the plurality of port network controllers instructing the second one of the plurality of port network controllers to operate as the master port network controller.

8. The method of claim 6 wherein sending at least one request further comprises:
sending a first request for the token from a first one of the plurality of port network controllers; and
sending a second request for the token from a second one of the plurality of pan network controllers.

9. A method of assigning a master port network controller when a telephony switching system is initialized, the telephony switching system comprising a first call server and a second call server interconnected by a communication link, and interfacing with two or more port network controllers to control the operation of at least one of a plurality of network ports in response to receive call request, the two or wore port network controllers connected on a token bus, the method comprising:
the first call server receiving call request, generating a call routing instruction, sending a copy of the received call request to the inactive call server, instructing one of the two or more port network controllers operate as the master port network controller;
the one of the two or more port network controllers transitioning to a master port network controller independent of said communication link functioning to interconnect said two call processing devices, the transition comprising:
requesting a token from the token bus;
receiving the token; and
informing the first call server that the one of the two or more port network controllers received the token.

* * * * *